United States Patent [19]

Hartley et al.

[11] Patent Number: 4,817,328

[45] Date of Patent: Apr. 4, 1989

[54] RELEASABLE DOWNRIGGER TROLLING APPARATUS

[75] Inventors: Susan I. Hartley; Ralph L. Short, both of Rock Springs, Wyo.

[73] Assignees: Susan I. Hartley; Hartley Trolline Limited, both of Rock Springs, Wyo. ; a part interest

[21] Appl. No.: 943,684

[22] Filed: Dec. 19, 1986

[51] Int. Cl.[4] .............................................. A01K 91/00
[52] U.S. Cl. ............................................................. 43/43.12
[58] Field of Search ...................... 43/43.12; 244/66.1, 244/66.2; 114/244, 297, 299

[56] References Cited

U.S. PATENT DOCUMENTS

| | | | |
|---|---|---|---|
| 2,121,279 | 6/1938 | Beck | 43/52 |
| 2,573,981 | 11/1951 | Nelson | 43/43.1 |
| 2,623,320 | 12/1952 | Bowman | 43/43.12 |
| 2,749,649 | 6/1956 | Fitzsimmons | 43/43.1 |
| 2,940,411 | 6/1960 | Bartels | 114/299 |
| 3,816,954 | 6/1974 | Bissonette | 43/43.12 |
| 3,835,573 | 9/1974 | Borchardt | 43/43.12 |
| 3,905,148 | 9/1975 | Naone | 43/43.12 |
| 3,961,437 | 6/1976 | Lewis | 43/27.4 |
| 4,012,863 | 3/1977 | Lori | 43/43.12 |
| 4,028,837 | 6/1977 | Clark | 43/43.12 |
| 4,069,611 | 1/1978 | Dusich et al. | 43/43.12 |
| 4,173,091 | 11/1979 | Emory, Jr. | 43/43.12 |
| 4,221,068 | 9/1980 | Roemer, Jr. | 43/43.12 |
| 4,261,130 | 4/1981 | Cudnohnfsky | 43/43.12 |
| 4,267,659 | 5/1981 | Grasso | 43/43.12 |
| 4,395,841 | 8/1983 | Cudnohufsky | 43/43.12 |
| 4,417,414 | 11/1983 | Hood et al. | 43/43.12 |
| 4,428,142 | 1/1984 | Shedd et al. | 43/43.12 |
| 4,430,823 | 2/1984 | Henze et al. | 43/43.12 |
| 4,453,336 | 6/1984 | Lowden | 43/43.12 |
| 4,520,589 | 6/1985 | Lummis | 43/43.12 |
| 4,565,026 | 1/1986 | Bohme | 43/43.12 |
| 4,574,516 | 3/1986 | Shedd et al. | 43/43.12 |
| 4,611,423 | 9/1986 | Rupp | 43/43.12 |
| 4,656,776 | 4/1987 | Macachor | 43/43.12 |

Primary Examiner—Kurt Rowan
Attorney, Agent, or Firm—John E. Reilly

[57] ABSTRACT

A downrigger assembly comprises a weight downline and line release mechanism which releasably secures a fishing line to the downline, the line release mechanism having a groove at one end opposite to the end connected to the downline which is oriented in a direction parallel to the downline, and a guide member is pivotally mounted for movement between a position in which it cooperates with the groove in retaining the fishing line therein and a position out of the path of the fishing line when sufficient force is applied to the guide member by the fishing line. The line release mechanism is attached to the downline so that it can be released and retrieved independently of the downline, and the downline itself includes a weighted member at its lower end having a releasable clamp to secure the downline to the weight so that the weight will normally travel in a horizontal direction but in the event of becoming lodged can be tipped so as to assist in its retrieval.

16 Claims, 2 Drawing Sheets

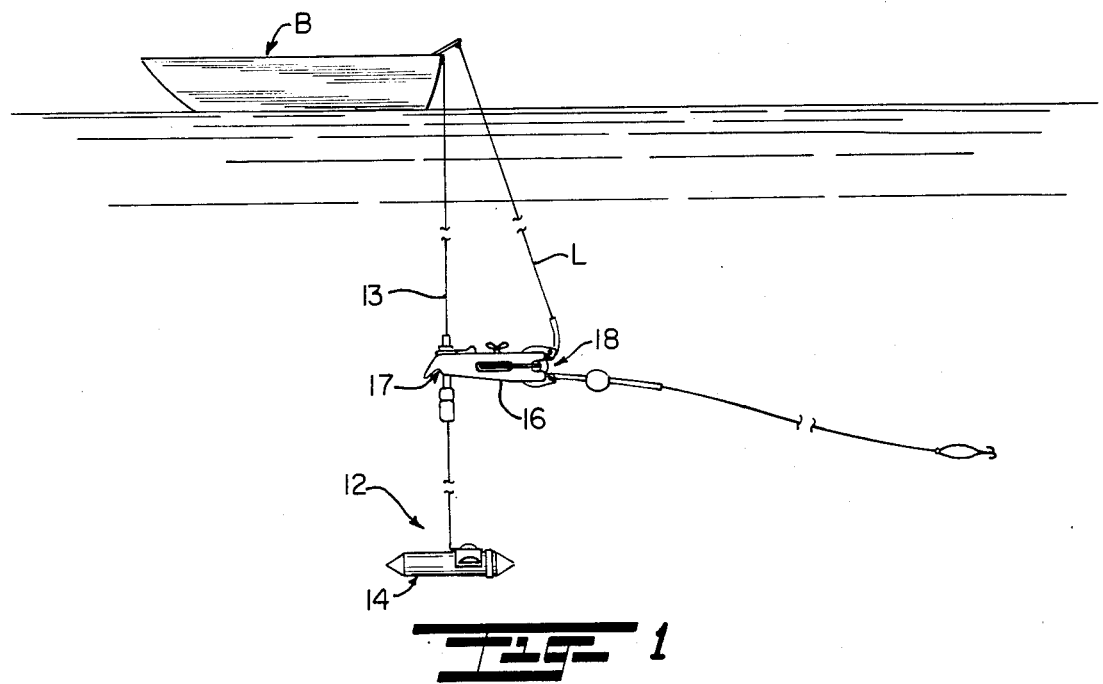
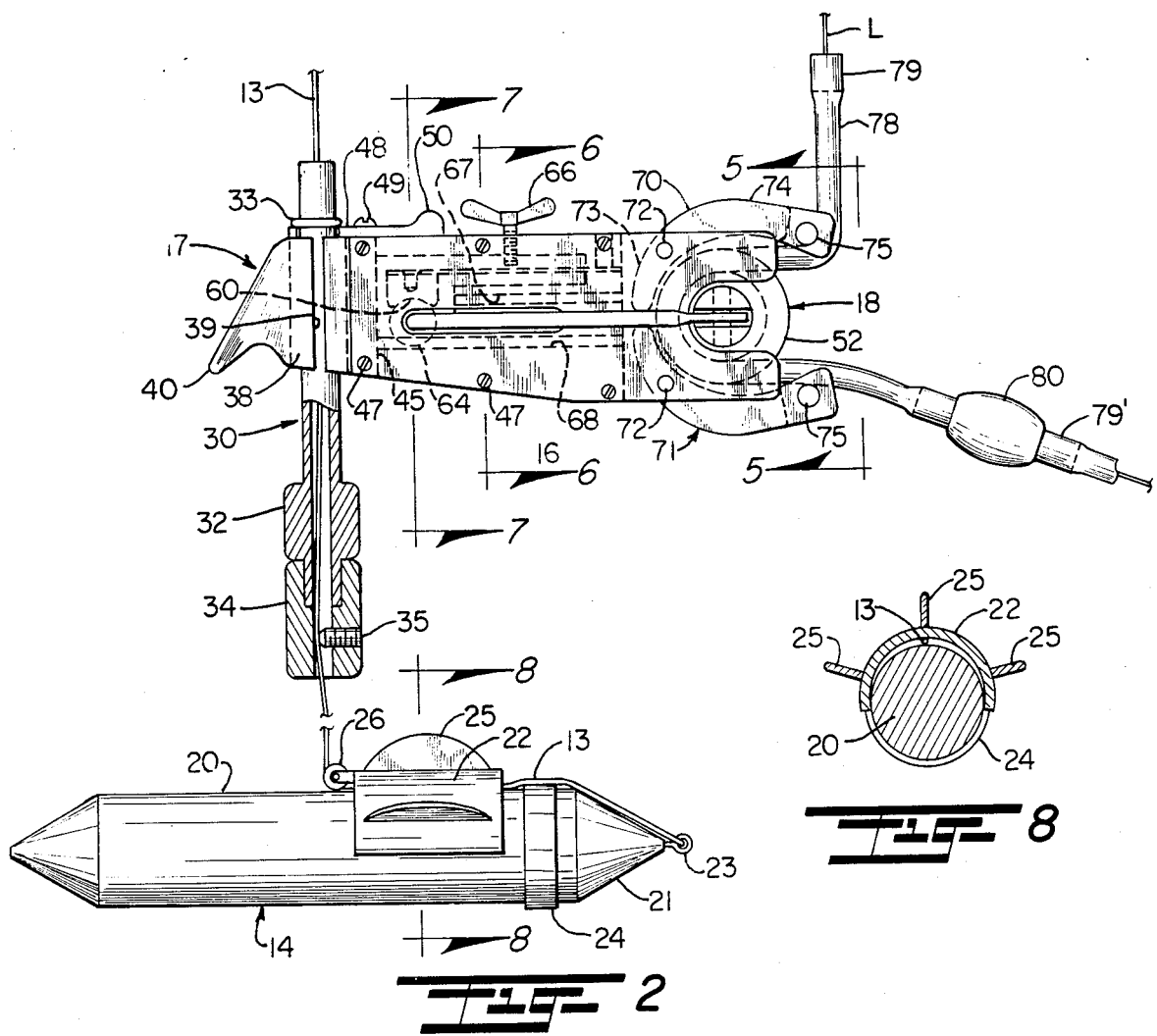

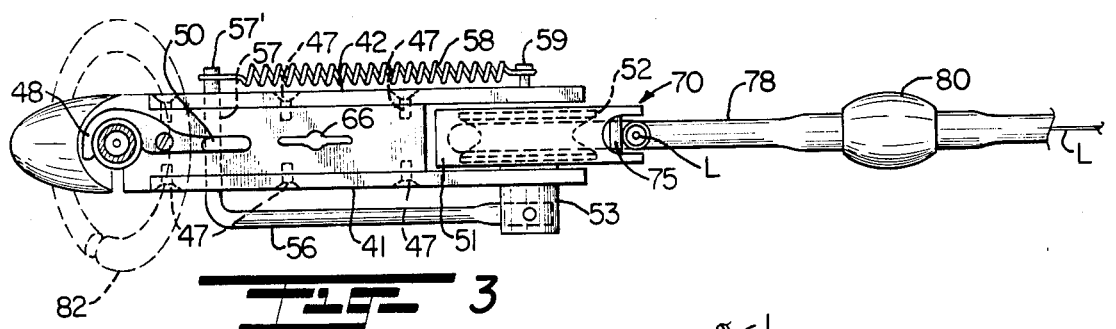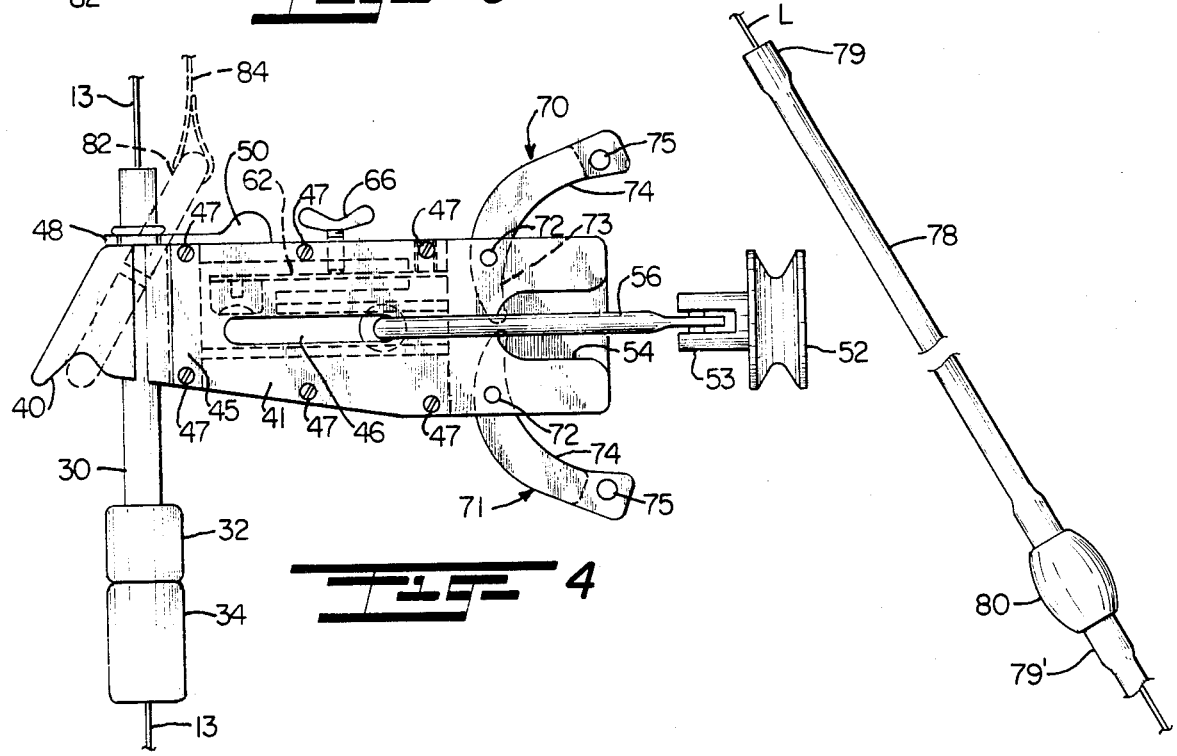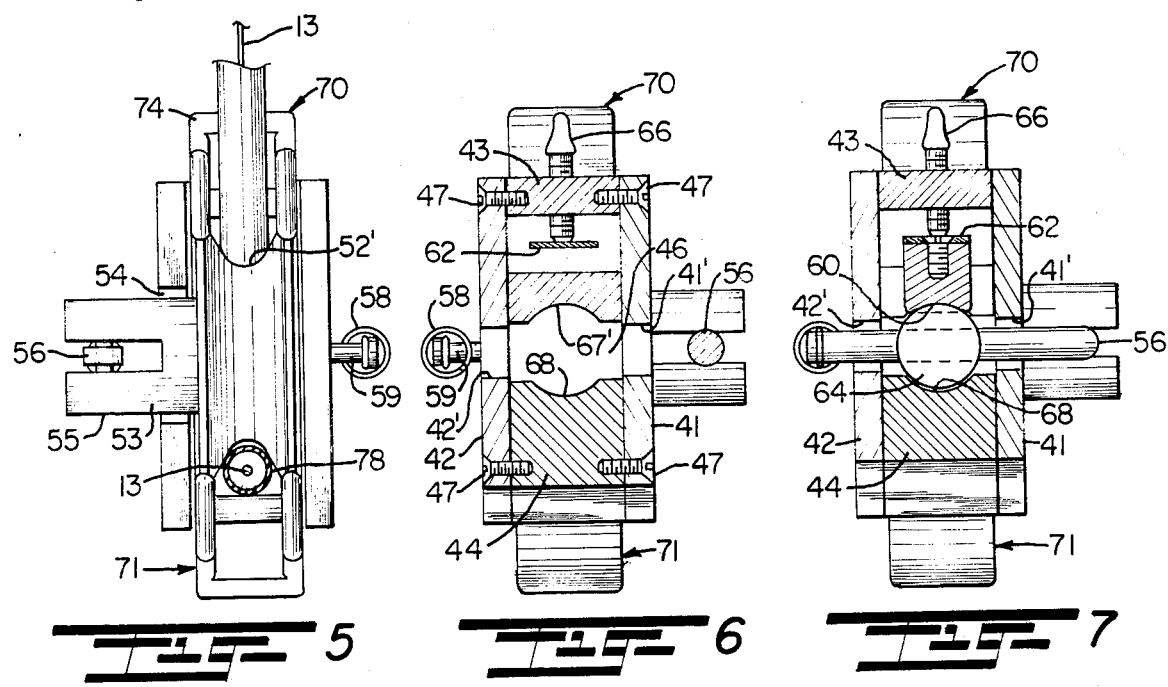

RELEASABLE DOWNRIGGER TROLLING APPARATUS

This invention relates to trolling apparatus for use in fishing; and more particularly relates to a novel and improved downrigger assembly which is extremely reliable and efficient in trolling operations.

BACKGROUND AND FIELD OF THE INVENTION

Numerous types of downrigger assemblies have been devised including a line release used in cooperation with a weighted cable in order to cause the fishing line to trail at a predetermined, submerged level from a boat. Typically, the weighted cable or downline has a substantial weight at its lower end to maintain the downline in a nearly vertical orientation; and, while the fishing line is weighted as well, it is not weighted to the same degree and will run from the line release device in a substantially horizontal direction and somewhat above the weighted end of the downline. Thus, there is a greater tendency for the weighted end of the downline to snag and, in the past, inadequate provision has been made for recovery of the downline; or, in cases where the downline is not recoverable, to effectively retrieve the line release device independently of the downline. The present invention is believed to overcome these and other problems in connection with downrigger apparatus and, in particular, contemplates a line release device for releasable attachment to the downline at the desired depth as well as to facilitate secure but detachable connection of the fishing line in such a way as to adjustably control the amount and direction of force required to release the fishing line in the event of a strike. Moreover, it is desirable to minimize wear, danger of snagging or severing of the fishing line, particularly at its point of connection to the line release mechanism.

Representative patents are U.S. Pat. Nos. 2,121,279 to G. Beck; 2,573,981 to F. W. Nelson; 2,623,320 to V. L. Bowman; 2,749,649 to A. L. Fitzsimmons; 3,816,954 to K. E. Bissonette; 3,961,437 to G. F. Lewis; 4,012,863 to J. Lori; 4,028,837 to N. E. Clark; 4,069,611 to J. G. Dusich et al; 4,173,091 to J. E. Emory, Jr.; 4,221,068 to L. J. Roemer, Jr.; 4,261,130 to S. R. Cudnohufsky; 4,267,659 to R. Grasso; 4,395,841 to W. D. Shedd et al; 4,417,414 to R. A. Hood et al; 4,430,823 to W. J. Henze et al; 4,453,336 to R. G. Lowden; 4,520,589 to M. G. Loomis; 4,565,026 to A. E. Bohme; and 4,574,516 to W. D. Shedd et al.

SUMMARY OF THE INVENTION

Accordingly, it is an object of the present invention to provide for a novel and improved downrigger assembly for use in trolling, the assembly including a weighted downline and line release which is both rugged and dependable in use.

It is a further object of the present invention to provide in a downrigger assembly for the secure but detachable connection of a line release to a weighted downline at the desired depth and in such a way as to assure that the line release can be retrieved in the event of loss of the downline.

It is an additional object of the present invention to provide for a novel and improved manner and means for secure but releasable connection of a fishing line to a line release, the line release being so constructed and arranged as to protect the line at its point of connection to the release mechanism and to adjustably control the amount of tension required to release the fishing line without danger of damaging or severing the fishing line; and further wherein the line release is reversible for more convenient use on either the left or righthand side of the boat.

An additional object of the present invention is to provide for a novel and improved line release mechanism for releasable connection of a fishing line thereto in such a way as to properly orient the line in trailing relation to the boat without wrapping or entwining the line around the release mechanism and to most effectively direct the application of force by the fish line with respect to the release mechanism in the event of a strike to assure most rapid and complete release of the line from the release mechanism; and further wherein the release mechanism incorporates a novel and improved adjustable tension control on the releasing elements.

In accordance with the present invention, a downrigger assembly is made up of the combination of a weighted downline and line release mechanism for releasably securing a fishing line to the downline, the release mechanism comprising a body at one end secured to the downline and a line-receiving groove at an opposite end thereof, the groove being oriented in a direction parallel to the downline, a guide member including a guide surface thereon, pivot means pivotally mounting the guide member for movement between a closed position in which the guide surface is disposed in confronting relation to the groove with the fishing line extending between the groove and guide surface and an open position in which the guide member is moved to one side and out of the path of the fishing line in response to a predetermined amount of force applied to the guide member by the fishing line in a direction away from the line-receiving groove. The fishing line includes a protective tubing in surrounding relation to that stretch of the line which is inserted into the release mechanism, the tubing not only serving to protect the line but to insure a proper fit between the line and release mechanism while lessening the possibility of snarling of the line.

Another feature of the present invention resides in the releasable connection of the line release to the downline such that the release mechanism can be adjustably but firmly secured at the desired depth but can be quickly released from the downline in the event that the downline should become entangled and irretrievable. To minimize the risk of loss of the downline, a unique form of weighted end is employed and is characterized by being in the form of a bullet-shaped weight with a finned saddle so that the weight will normally be oriented with its longitudinal axis traveling in a horizontal direction but in the event of becoming lodged or snarled can be tipped upwardly to assist in its retrieval.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a side view illustrating a preferred form of downrigger assembly secured in a trolling position from the end of a boat, in accordance with the present invention;

FIG. 2 is an enlarged view in elevation and partially in section of the preferred form of line release mechanism and weighted downline in accordance with the present invention;

FIG. 3 is a top plan view of a preferred form of line release mechanism in accordance with the present invention;

FIG. 4 is an enlarged side view in elevation of the preferred form of line release mechanism illustrated in the release position;

FIG. 5 is an end view of the line release mechanism in the closed position as shown in FIG. 2;

FIG. 6 is a cross-sectional view taken about lines 6—6 of FIG. 4;

FIG. 7 is a cross-sectional view taken about lines 7—7 of FIG. 4; and

FIG. 8 is a cross-sectional view taken about lines 8—8 of FIG. 2.

DETAILED DESCRIPTION OF THE PREFERRED EMBODIMENT

Referring in detail to the drawings, FIG. 1 illustrates the suspension of a fishing line L from a downrigger assembly which is disposed in a trolling position from the end of a boat B. The assembly is broadly comprised of a weighted downline 12 having a cable 13 and a bullet-shaped weight 14 at its lower end; and a line release mechanism 16 is releasably attached at one end 17 to the cable 13 while the line L is releasably secured at an opposite end 18 of the line release 16 so as to trail rearwardly in a generally horizontal attitude away from the line release mechanism.

As best seen from a consideration of FIGS. 2 and 8, the weight 14 includes a somewhat elongated or cigar-shaped body 20 terminating in a tapered leading end 21 and which as earlier mentioned is, overall, of generally bullet-shaped configuration. The cable 13 is connected by means of a swivel 23 to the trailing end or nose 21 of the weight 14. In order to control the attitude or disposition of the weight in the water, a saddle clamp 22 of generally semi-cylindrical configuration is given a radius of curvature slightly less than the body 20 and is composed of a resilient or spring-like material, and a guide roller 26 is disposed at one end of the clamp 22. In this way, the clamp 22 can be placed in pressfit or frictional engagement over the upper surface of the body 20, as shown in FIG. 8, with the lower end of the cable 13 extending beneath the clamp 22 and guide roller 26, then passes over a collar 24 and is connected to eyelet 23. Briefly, the function of the circular rib 24 is to limit the sliding movement of the clamp 22 along the body so that, as long as the downline is advancing through the water without any impediment, the weight 14 will assume a generally horizontal or slightly downwardly tipped attitude in advancing through the water. However, if the weight should become lodged or entangled, the tension of the cable 13 will be great enough to release the saddle clamp 22 thereby causing the trailing end of the weight to be tipped upwardly so that the downline will then exert a force more in line with the longitudinal axis of the weight and make it easier to dislodge or retrieve the weight. The saddle clamp 22 is provided also with radially directed fins 25 which will assist in controlling the course of the weight 14 through the water.

In order to releasably connect the line release mechanism 16 to the cable 13, a sleeve 30 is slipped over the cable 13 and has a wide flange or enlargement 32 at its lower end and a relatively narrow flange 33 at the upper end. A clamping sleeve 34 is clamped to the cable 13 by a locking screw 35 which bears against the cable and fixes the sleeve 34 in the desired position on the cable 13 with the lower flange 32 resting on the sleeve 34.

The line release mechanism 16 is of generally oblong or rectangular configuration and tapers toward the end 17 which is to be releasably connected to the sleeve 30. For this purpose, the end 17 has a hollow cylindrical portion 38 including a longitudinally extending slot 39 so that the cable 13 can be advanced laterally through the slot 39 and within the cylindrical portion 38 above the sleeve member 30. The cylindrical portion 38 is sized so as to be free to slide over the sleeve 30 into the position as illustrated in FIG. 2 and is retained between the upper and lower flanges by a releasable latch member 48 hereinafter described in more detail. A line retriever catch 40 projects laterally and downwardly away from the cylindrical portion 38 to assist in retrieval of the line release mechanism. It will be noted that the body 16 includes sidewalls 41 and 42 which are spaced apart by top and bottom walls 43 and 44 along with an end wall 45 which abuts the cylindrical portion 48. As illustrated, suitable fasteners in the form of screws 47 serve to attach the sidewalls 41 and 42 to opposite sides of the end wall 45 as well as the top and bottom walls 43 and 44 so as to form an interior cavity or chamber 46. Longitudinally extending slots 41' and 42' are formed in each sidewall in coextensive relation to one another. Preferably, the latch 48 is affixed by a pin 49 to the top wall 43 for swiveled movement of the latch 48 into encircling relation to a portion of the sleeve 30 as shown in FIG. 2. When the latch member 48 is positioned as shown in FIG. 2, it will abut the upper flange 33 so as to retain the mechanism 16 on the sleeve. When desired to remove the line release mechanism 16, a thumb release end 50 on the latch 48 is manually grasped to swivel the latch member about the pin 49 and swing the latch away from engagement with the sleeve 30 so that the cylindrical portion 38 is free to slide over the flange 33.

An important feature of the line release mechanism resides in the detachable connection of the fishing line L to the end 18 of the mechanism. Here, the sidewall 41 has an open slot 54 at the end 18, and a pocket or groove area 51 is formed between the ends of the sidewalls 41 and 42 for disposition of a guide wheel 52. The guide wheel 52 is fixed on a stub shaft 53 which extends away from the center of the wheel through the slot 54 in the sidewall 41. The shaft 53 has a bifurcated end 55 pivotally connected to the outer distal end of a rod 56 which extends forwardly and externally of the sidewall 42 from a bent connecting end 57. The connecting end 57 extends through the aligned slots 41' and 42' in the sidewalls and terminates in a free end 57' externally of the opposite sidewall 42. A return spring 58 is connected between the free ends 57' and a fixed pin 59 at the front or distal end of the sidewall 42 so as to normally urge the rod 56 to advance forwardly through the aligned slots. However, the connecting end 57 is normally anchored at the rearward end of the cavity 46 by a concave seat 60 at the rearward, free end of a leaf spring 62. The spring 62 is anchored at its forward end of the cavity by a pin 63 and extends rearwardly along the undersurface of the top wall 43 with the concave seat 60 projecting downwardly from the free end of the spring into the path of the connecting end 57. The connecting end 57 has an enlarged spherical portion 64 which is alignable with the seat 60 when the connecting end 57 is forced rearwardly into position beneath the seat. A direct forward pull or force on the wheel 52 sufficient to overcome the pressure of the seat 60 and attached spring 62 will effect the release of the spherical portion 64 so that the rod 56 is then sprung forwardly by the spring 58 to cause the wheel 52 to advance out of the groove 51. The degree of resistance to release of the rod 56 from the seat 60 is controlled by the tension screw 66 which is threaded through the top wall 43 into engagement with the top surface of the spring 62. It will be apparent that inward threading of the screw 66 will increase the tension of the seat or depression 60 and require a greater force to release the connecting end 57 and rod 46 as described. When released, the spherical portion 64 is aligned with upper and lower channel surfaces 67 and 68, as best seen from FIGS. 6 and 7, to guide the forward advancement of the connecting end 57 through the slots 41' and 42'. The length of the slots 41' and 42'0 is such that the rod is free to advance forwardly over a distance sufficient to permit the wheel 52 to clear the terminal ends of the sidewalls 41 and 42 whereupon the wheel 52 is free to pivot about the connection of its shaft 53 to the leading end of the rod 56, or in other words, to swing laterally and outwardly away from the entrance to the line-receiving groove 51.

Positioned above and below the entrance to the line-receiving groove 51 are pivotal rocker arm members 70 and 71 of corresponding construction, each arm being of arcuate configuration and pivoted as at 72 between the forward end 18 of the sidewalls 41 and 42. An inward extension 73 of each arm extends across and follows the curvature of the innermost end of the wheel 52 when inserted into the groove, and a forward extension 74 of each arm terminates in a roller guide 75 just forwardly of the leading or forwardmost edges of the sidewalls 41 and 42. An important advantage of employing rocker-arms 70 and 71 is to permit the line release to be reversed or turned upside down in its connection to the downline. In this way, the lower rocker arm 71 would then serve as the upper rocker arm, and the wheel 52 would then be pivoted away from the line release mechanism in a direction opposite to that as shown. This affords some added convenience to the fisherman, depending upon whether he or she is fishing from the left side or right side of the boat, particularly in order to facilitate loading of the fishing line into connected relation to the line release mechanism. In reversing the line release mechanism, it is desirable to provide an extra threaded opening on the bottom wall surface so that the latch 48 may be attached on the opposite surface and more easily accessible in latching and unlatching the line release mechanism 16 with respect to the sleeve 30.

A line protector in the form of a surgical tube 78 having upper and lower spaced collars 79 and 79' at opposite ends is disposed in surrounding relation to a limited stretch of the fishing line L which is to be secured to the line release mechanism 16, and a lead sinker 80 is positioned on the collar 79' at the lower end. The surgical tubing is dimensioned so as to loosely surround the line and permit lengthwise adjustment along the line L to that section which is to be secured. Prior to submersion of the entire assembly in the water, the fishing line L is assembled to the line release mechanism 16 by attaching that section covered with the surgical tubing within the line-receiving groove 51 such that the upper and lower ends of the tubing 78 which lead away from the groove are passed over the roller guides 75, following which the wheel 52 is folded rearwardly and forced into the groove with the connecting end 57 advanced rearwardly into seated engagement with the keeper 60. In the closed or secured position, as best seen from FIG. 5, the wheel 52 is retained by the sidewalls 41 and 42 against pivotal movement and, in this relation, the wheel 52 is preferably given a generally concave, cross-sectional configuration along its guide surface 52' so as to center the line L against shifting or lateral movement within the groove. Under the application of a sufficient pull or force to the lower end of the fishing line L, such as, in the event of a strike, the tension of the line L against the inner guide surface of the wheel 52 will be imparted to the connecting end 57 of the rod 56 to release the rod for forward travel away from the keeper 60 whereupon clearing the forward edges of the sidewalls 41 and 42 the wheel will pivot or swing laterally out of the path of movement of the line, as illustrated in FIG. 4. Simultaneously, the pressure of the line L against upper and lower guide rollers 75 will cause the arms 70 and 71 to pivot outwardly, as shown in FIG. 4, with the inner extensions 73 advancing forwardly to assure complete release or escape of the line from the pocket or groove.

In a typical trolling operation, the fishing line L is secured to the line release mechanism 16 as described. Similarly, the line release mechanism 16 is assembled onto the sleeve 30 with the sleeve 30 and clamp 34 being positioned at a depth corresponding to the length of the line extending from the boat to the line release mechanism, as illustrated in FIG. 1. Again, the line release mechanism is easily installed by passing the cable 13 through the slot in the cylindrical portion 38 of the line release mechanism, then lowering the cylindrical portion 38 over the upper flange and retaining in place by closing the catch 40 over the sleeve. In trolling, the weight 14 will cause the cable 13 to assume a substantial vertical orientation in the water with the line release mechanism 16 trailing rearwardly from the weighted cable or downline 13; and the remaining length of the fishing line L leading from the lower end of the line release mechanism will of course trail rearwardly away from the entire assembly. If the weight 14 should become lodged, the clamp 22 will be released as described so as to permit some manipulation of the downline 13 in attempting to retrieve it. If it is impossible to retrieve, a split retrieval ring 82 is lowered via a separate cable 84 along the upper stretch of the cable 13 until the ring slips into position beneath the catch 40. Upward pressure on the ring 82 will carry the sleeve 30 upwardly along the cable 13 to the surface so that the latch 48 can be released away from engagement with the upper flange. At that point, the line release mechanism 16 will clear the sleeve and can be drawn upwardly out of the water. As a result, the line release mechanism 16 may be recovered even though it should become necessary to sever the weighted cable or downline 13.

It will be evident that the use of the surgical tubing 78 in association with the fishing line L offers numerous advantages from the standpoint of securement of the line L to the line release mechanism 16 and increasing the frictional engagement between the tubing 78 and wheel when in the closed position within the groove or pocket 51. When the fishing line is released from the line release mechanism, the tubing is free to slide downwardly along the line until it abuts the lower end of the line. The line release mechanism 16 may be effectively employed with a fishing line not having the surgical tubing, although of course the line itself will not fit as snugly between the wheel and arm members 70 and 71. In that event, the line is wrapped or wound around the wheel 52 a number of times prior to insertion of the wheel into the groove 51. When the wheel is released, the line will unwind itself from the wheel so as to effect a complete release. In either type of installation, should the tension required for release of the line be unduly great, the tension screw 66 simply may be threadedly adjusted to reduce the amount of force required.

It is therefore to be understood that the above and other modifications and changes may be made in the preferred form of invention as herein set forth and described without departing from the spirit and scope of the present invention as defined in the appended claims.

We claim:

1. A line release mechanism for releasably securing a fishing line to a cable comprising:

a body having one end secured to said cable and a line-receiving groove at an opposite end thereof, a guide member including a guide surface thereon, said groove oriented in a direction substantially parallel to said guide surface, pivot means pivotally mounting said guide member for movement between a closed position in which said guide surface is disposed in confronting relation to said groove to define an arcuate guide path with said fishing line extending along said guide path between said groove and said guide surface and an open position in which said guide member is moved to one side and out of the path of said fishing line in response to a predetermined amount of force applied to said guide member in a direction away from said line-receiving groove, said guide member defined by a wheel mounted on an axis normal to the extension of said fishing line between said wheel and said line-receiving groove, said guide surface formed on an external surface of said wheel, said line-receiving groove recessed into said opposite end of said body, and said pivot means including an arm member having one end pivotally connected to said wheel for pivotal movement of said wheel about an axis normal to and intersecting said wheel axis.

2. A downrigger line release mechanism according to claim 1, said arm member having an opposite end mounted in a cavity in said body for slidable movement in a direction toward and away from said line-receiving groove, and releasable retainer means in said cavity engageable with the opposite end of said arm to yieldingly resist slidable movement of the opposite end of said arm through said cavity until a predetermined amount of force is applied to said arm to overcome said releasable retainer means.

3. A downrigger line release mechanism according to claim 1, including at least one arcuate guide portion in said line-receiving groove and in outer radially spaced relation to said guide member.

4. A downrigger line release mechanism according to claim 3, there being a pair of said guide portions including means pivotally mounting said guide portions for movement toward and away from an entrance end of said groove, said guide portion(s) having guide roller(s) in diametrically opposed relation to said guide member.

5. A downrigger line release mechanism for releasably securing a fishing line to a weighted cable comprising:

a body having one end secured to said cable and a line-receiving groove at an opposite end thereof, said groove oriented in a direction substantially parallel to said cable, a guide member including a guide surface thereon, pivot means pivotally mounting said guide member for movement between a closed position in which said guide surface is disposed in confronting relation to said groove with said fishing line extending between said groove and said guide surface and an open position in which said guide member is moved to one side and out of the path of said fishing line in response to a predetermined amount of force applied to said guide member in a direction away from said line-receiving groove, said pivot means including an arm member having one end pivotally connected to said guide member for pivotal movement of said guide member, said arm member having an opposite end mounted in a cavity in said body for slidable movement in a direction toward and away from said line-receiving groove, and releasable retainer means in said cavity engageable with the opposite end of said arm to yieldingly resist slidable movement of the opposite end of said arm through said cavity until a predetermined amount of force is applied to said arm to overcome said releasable retainer means.

6. In a downrigger assembly wherein a line release mechanism is operative to releasably secure a fishing line to a weighted downline, the improvement comprising:

said line release mechanism including a body having one end releasably secured to said cable and a line-receiving groove at an opposite end thereof, a guide member including a guide surface thereon, pivot means pivotally mounting said guide member for movement between a closed position in which said guide surface is disposed in confronting relation to said groove with said fishing line extending between said groove and said guide surface and an open position in which said guide member is moved out of the path of said fishing line in response to a predetermined force applied to said guide member in a direction away from said line-receiving groove; and means for releasably securing said one end of said line release mechanism to said cable whereby to support said mechanism at a predetermined depth in the water, and lift means engageable with said mechanism for lifting said mechanism along said cable independently of said releasable securing means, said releasable securing means including a sleeve member in surrounding relation to said cable and means for releasably clamping said sleeve member to said cable, a line release mounting sleeve disposed on said cable above said releasable securing means and freely slidable on said cable above said releasable securing means, and said line release mechanism releasably secured to said line release mounting sleeve for freely slidable movement with said mounting sleeve.

7. In a downrigger assembly according to claim 6 wherein said guide member is defined by a wheel and said guide surface is an arcuate groove formed on an external surface of said wheel, said wheel mounted on an axis normal to the extension of said fishing line between said wheel and said line-receiving groove.

8. In a downrigger assembly according to claim 6, said line release mechanism including a hollow cylindrical portion having a longitudinal slot therein, said cylindrical portion disposed in surrounding relation to said mounting sleeve, a circular flange on said mounting sleeve, and latch means on said line release mechanism movable into encircling relation to said mounting sleeve and into abutting relation to said flange on said mounting sleeve whereby to releasably retain said line release mechanism on said mounting sleeve.

9. In a downrigger assembly according to claim 6, said line release mechanism including a catch at the one end thereof, and a slip ring movable into engagement with said catch for lifting said line release mechanism and mounting sleeve upwardly along said cable and away from said releasable securing means.

10. In a downrigger assembly according to claim 7, said pivot means including an arm member having one end pivotally connected to said wheel for pivotal movement of said wheel about an axis normal to and intersecting said wheel axis, said arm member having an opposite end slidably mounted in a slot in said body for movement toward and away from said line-receiving groove, and releasable retainer means in said slot and engageable with the opposite end of said arm to yieldingly resist slidable movement of the opposite end of said arm through said slot.

11. In a downrigger assembly according to claim 6, said line-receiving groove being of generally concave configuration and said guide member having a convex guide surface complementary to said line-receiving groove, and guide rollers disposed at the entrance to said groove, at least one of said guide rollers including means pivotally mounting said guide roller(s) for movement toward and away from said entrance to said line-receiving groove.

12. In a downrigger assembly according to claim 6, a protective flexible tube disposed in surrounding relation to said fishing line along that length of the fishing line inserted into said line-receiving groove, said flexible tube including a weight at one end between said line-receiving groove and the bait end of said fishing line.

13. In a downrigger assembly wherein a line release mechanism is operative to releasably secure a fishing line to a downline, the combination therewith comprising:

a weight member at the lower end of said downline including a cylindrical body, said downline attached to one end of said body, a generally saddle-shaped clamping member releasably clamped to a cylindrical surface portion of said body with said cable extending between said clamping member and said body, and said clamping member having radially outwardly directed fins at circumferentially spaced intervals thereon.

14. In a downrigger assembly according to claim 13, said clamping member being of generally semi-circular configuration having a radius of curvature less than that of said cylindrical body and said clamping member being composed of a resilient material.

15. A line release mechanism for releasably securing a fishing line to a cable comprising:

a body having one end secured to said cable and a line-receiving groove at an opposite end thereof, a guide member including a guide surface thereon, said groove oriented in a direction substantially parallel to said guide surface, pivot means pivotally mounting said guide member for movement between a closed position in which said guide surface is disposed in confronting relation to said groove to define an arcuate guide path with said fishing line extending along said guide path between said groove and said guide surface and an open position in which said guide member is moved to one side and out of the path of said fishing line in response to a predetermined amount of force applied to said guide member in a direction away from said line-receiving groove; and a protective flexible sleeve disposed in surrounding relation to said fishing line along that length of the fishing line inserted intos aid line-receiving groove.

16. A downrigger line release mechanism according to claim 15, said flexible sleeve including a weight at one end between said line-receiving groove and the bait end of said fishing line.

* * * * *